United States Patent [19]

Mizuno et al.

[11] Patent Number: 4,892,436
[45] Date of Patent: Jan. 9, 1990

[54] SHAFT COMPOSITE STRUCTURE BETWEEN CERAMIC TURBINE ROTOR AND METAL MEMBER

[75] Inventors: Takeyuki Mizuno, Toyohashi; Seiichi Asami, Okazaki, both of Japan

[73] Assignee: NGK Insulators, Ltd., Nagoya, Japan

[21] Appl. No.: 172,378

[22] Filed: Mar. 24, 1988

[30] Foreign Application Priority Data

Mar. 30, 1987 [JP] Japan .............................. 62-45875[U]

[51] Int. Cl.⁴ ............................................... B25G 3/00
[52] U.S. Cl. ..................................... 403/404; 403/28; 416/241 B
[58] Field of Search ..................... 403/28, 29, 30, 404; 416/241 B, 244 A

[56] References Cited

U.S. PATENT DOCUMENTS 4,722,630  2/1988  Fang ................................. 403/30

FOREIGN PATENT DOCUMENTS 0184457   6/1986  European Pat. Off. .
3535511   4/1986  Fed. Rep. of Germany ........ 403/30
61-226501 8/1986  Japan .
62-56621 12/1987  Japan .

Primary Examiner—Andrew V. Kundrat
Attorney, Agent, or Firm—Arnold, White & Durkee

[57] ABSTRACT

In a shaft composite structure wherein a ceramic shaft integrally formed with a ceramic turbine rotor is fixed to a metal sleeve integrally formed with a metal rotary shaft of a compressor impeller, a connection edge is located at a position corresponding to a recess for seal ring, and a thickness of tip portion of the metal sleeve is made thin to reduce a stiffness.

Therefore, a stress concentration at the connection edge can be eliminated effectively and thus a reliable shaft composite structure can be obtained.

10 Claims, 2 Drawing Sheets

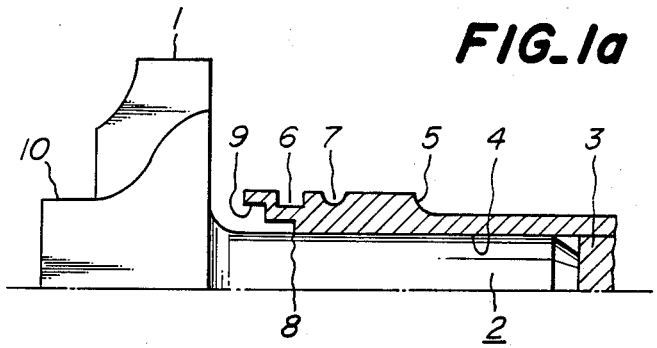
FIG_1a
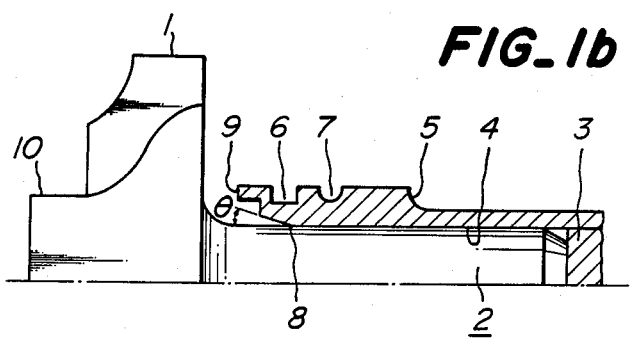
FIG_1b
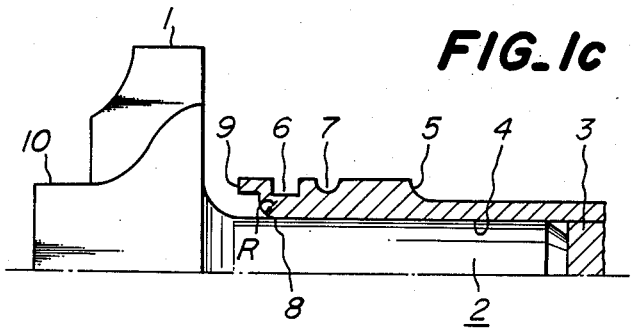
FIG_1c

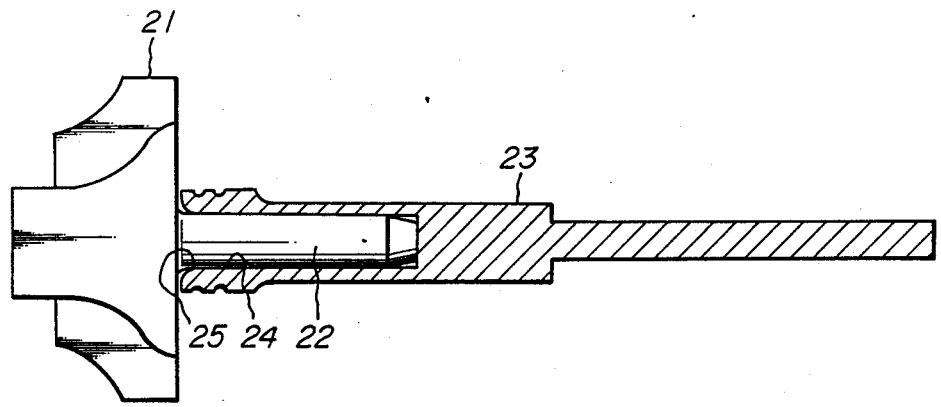

SHAFT COMPOSITE STRUCTURE BETWEEN CERAMIC TURBINE ROTOR AND METAL MEMBER

BACKGROUND OF THE INVENTION

1. Field of the Invention

The present invention relates to a shaft composite structure between a turbine rotor made of ceramic and a compressor impeller made of metal material.

2. Related Art Statement

Referring to FIG. 2, such a turbine rotor has a construction such that a shaft 22 integrally formed with a turbine rotor 21 is fixed to a metal sleeve 24 integrally formed with a rotary shaft 23 made of metal material by means of known connection methods such as a pressure insertion, thermal insertion, chill insertion, soldering and the like.

In the turbine rotor having the construction mentioned above, the stress concentration is liable to occur at a connection edge 25 between the ceramic shaft 22 and the meal sleeve 24, so that the ceramic shaft 22 is liable to be broken from the connection edge 25.

Moreover, when the ceramic turbine rotor rotates at a high speed, the ceramic shaft 22 is also liable to be broken from the connection edge 25 due to a bending moment produced from a slight unbalance of weight distribution.

SUMMARY OF THE INVENTION

The present invention has for its object to eliminate the drawbacks mentioned above and to provide a shaft composite structure between a ceramic turbine rotor and a metal member which results in a reliable ceramic turbine rotor produced in a relatively easy manner.

According to the invention, a shaft composite structure having a ceramic shaft integrally formed with a ceramic turbine rotor is fixed to a metal sleeve integrally formed with a metal rotary shaft of a compressor impeller, wherein the structure comprises a construction such that a connection edge between the ceramic shaft and metal sleeve is located at a position corresponding to a recess for a seal ring arranged on an outer surface of the metal sleeve, and a thickness of a tip portion of the metal sleeve distal from the connection edge is thin as compared to that of the metal sleeve proximate the connection edge between the metal sleeve and the ceramic shaft.

In the construction mentioned above, since the connection edge is located at a position corresponding to the recess for an oil seal or the like, and a thickness of the tip portion of the metal sleeve is decreased gradually from the connection edge toward the turbine rotor, the stress concentration is decreased materially, so that the breakage of the ceramic shaft at the connection edge can effectively be eliminated.

To even more effectively eliminate the stress concentration, it is preferable to set the thickness of the tip portion of the metal sleeve from 0.5 mm to 1.5 mm. This is because the stress concentration becomes large if the thickness is too great, and the recess for the seal ring cannot be formed on the metal sleeve if the thickness is too small. Further, if the thickness is too small in the case that the ceramic shaft is broken, the metal sleeve may also be broken.

Moreover, if the inner shape of the metal sleeve is formed in the manner such that the inner diameter thereof is increased gradually by a taper shape or a circular shape, the stress concentration can be further decreased.

BRIEF DESCRIPTION OF THE DRAWINGS

FIGS. 1a to 1c are schematic views showing an embodiment of a shaft composite structure according to the present invention, respectively; and FIG. 2 is a schematic view illustrating an embodiment of a known shaft composite structure.

DESCRIPTION OF THE PREFERRED EMBODIMENTS

FIGS. 1a to 1c are schematic views showing an embodiment of a shaft composite structure according to the present invention, respectively. In the respective embodiments, a turbine rotor 1 made of ceramic has a ceramic shaft 2 integrally formed thereto. A depression hole 4 is formed at a tip portion of a metal rotary shaft 3 on a side of the turbine shaft 1, in order to coaxially connect the rotary shaft 3 with the ceramic shaft 2. The depression hole 4 of the rotary shaft 3 constructs a metal sleeve 5. A recess for a seal ring 6 and an oil slinger 7 are formed on an outer surface of the metal sleeve 5. As for a ceramic material, it is preferred to use silicon nitride, silicon carbide, sialon, or the like. As for a metal material, it is preferred to use a precipitation hardening alloy such as incolloy, a heat resisting alloy, or the like.

In the shaft composite structure mentioned above, one embodiment shown in FIG. 1a has a construction such that a connection edge 8 is located at a position corresponding to the recess for a seal ring 6 of the metal sleeve 5 and the thickness of a tip portion 9 is made thin as compared to the connection edge 8 to decrease the stress concentration. A preferable thickness of the tip portion 9 is varied corresponding to a dimension of the shaft composite structure, but usually a value between 0.5 mm and 1.5 mm is preferred. In the second embodiment shown in FIG. 1B, the location of the connection edge 8 and the thickness of the tip portion 9 are limited in the same manner as the embodiment shown in FIG. 1a and further, an inner shape of the metal sleeve 5 from the connection edge 8 to the tip portion 9 is tapered and has a predetermined angle with respect to an axis of the rotary shaft 3. In a third embodiment shown in FIG. 1c, the location of the connection edge 8 and the thickness of the tip portion 9 are limited in the same manner as the embodiment shown in FIG. 1a and further, an inner surface of the metal sleeve 5 from the connection edge 8 to the tip portion 9 is circular shaped and has a diameter R.

Hereinafter, the present invention will be explained with reference to the following examples, which are in no way intended to limit the scope of the claims recited hereinafter.

EXAMPLE 1

Five ceramic turbine rotors made of silicon nitride each having a rotor diameter of 70 mm and five metal rotary shafts such as shown in FIG. 1a having various stiffnesses due to varying the thickness of the tip portion 9 were prepared. Subsequently, five shaft composite structures were formed by connecting the thus prepared ceramic turbine rotor and metal rotary shafts. A failure strength F was measured to investigate an influence of the stiffness. To obtain the failure strength F, a strength was loaded at a hub-top 10 of the ceramic turbine rotor 1 under the condition such that an outer surface of the metal sleeve 5 was supported by a supporting member, and a broken strength was used as the failure strength F. The results of the average test values are shown in Table 1.

TABLE 1

| Thickness of tip portion (mm) | 2 | 1.5 | 1.0 | 0.5 | 0.2 |
|---|---|---|---|---|---|
| Failure strength F (kgf) | 47 | 50 | 55 | 65 | 66 |

From the results shown in Table 1, the shaft composite structure wherein the thickness of the tip portion from the connection edge is small exhibits a higher failure strength as compared with the shaft composite structure wherein the thickness of the tip portion is not small. Moreover, when the thickness is further decreased, the failure strength increases. However, the failure strength becomes constant when the thickness is less than 0.5 mm, and the metal sleeve is not endured if the ceramic shaft should be broken. Therefore, it is preferable to set the thickness of the tip portion at a value greater than over 0.5 mm.

EXAMPLE 2

Five ceramic turbine rotors made of silicon nitride each having a rotor diameter of 70 mm and five metal rotary shafts such as shown in FIG. 1b having various taper angle with respect to the shaft axis of the rotary shaft were prepared. Subsequently, five shaft composite structures were formed by connecting the thus prepared ceramic turbine rotor and metal rotary shafts. The failure strength F was also measured in the same manner as that of the example 1 to investigate an influence of the taper angle. In this case, all the shaft composite structures tested had a thickness of the tip portion 9 equal to about 1 mm. The results of the test are shown in Table 2.

TABLE 2

| Taper angle θ | 0.5° | 1.5° | 3.5° | 5° |
|---|---|---|---|---|
| Failure strength F (kgf) | 76 | 76 | 64 | 57 |

From the results shown in Table 2, it is understood that the shaft composite structure having the thickness of the tip portion 9 of 1 mm wherein the taper angle θ at the connection edge is increased can obtain a correspondingly higher failure strength. Moreover, it is preferable to set the taper angle θ from 0° to 3.5°.

EXAMPLE 3

Five ceramic turbine rotors made of silicon nitride each having a rotor diameter of 70 mm and five metal rotary shafts such as shown in FIG. 1c having various circular shapes by varying the diameter R were prepared. Subsequently, five shaft composite structures were formed by connecting the thus prepared ceramic turbine rotors and metal rotary shafts. The failure strength F was also measured in the same manner as that of the example 1 to investigate an influence of the circular diameter R. In this case, all the shaft composite structures tested had a thickness of the tip portion 9 of 1 mm. The results of the average test values are shown in Table 3.

TABLE 3

| Circular diameter R (mm) | 0 | 1.5 | 3 | 5 | 10 |
|---|---|---|---|---|---|
| Failure strength F (kgf) | 55 | 57 | 65 | 70 | 73 |

From the results shown in Table 3, it is understood that the shaft composite structure having the thickness of the tip portion 9 of 1 mm and an increased circular diameter R at the connection edge can obtain a correspondingly higher failure strength. Moreover, it is preferable to set the circular diameter R for a value greater than 3 mm.

Further, a rotation test at higher temperatures was performed for the shaft composite structures obtained in Examples 1 to 3 under the following conditions: gas environment at 900° C.; a rotation of 120 thousands rpm; and a time of 100 hours. However, all the shaft composite structures according to the invention were not damaged.

The present invention is not limited to the embodiments mentioned above but various modifications are possible. For example, in the embodiments mentioned above, the ceramic shaft 2 and the metal sleeve 5 both can have straight outer surfaces but the present invention preferably utilizes a shaft composite structure wherein the diameter of the shaft is varied to perform the connection at various points or a shaft composite structure wherein the metal sleeve is connected to the metal rotary shaft by means of a friction pressure welding.

According to the present invention, since the location of the connection edge is limited, the thickness of the tip portion of the metal sleeve is made thin and preferably the inner surface of the metal sleeve from the connection edge toward the ceramic turbine rotor is tapered or circular shaped, such that higher reliability shaft composite structures can be obtained.

What is claimed is:

1. A shaft composite structure wherein a ceramic shaft integrally formed on a ceramic turbine rotor is coaxially fixed to a metal sleeve integrally formed on a metal rotary shaft of a compressor impeller, comprising a connection edge formed on said metal sleeve in contact with said ceramic shaft, said edge being located at a position in substantial alignment with a recess arranged on an outer surface of said metal sleeve, such that said edge and said recess are arranged substantially in a radial plane which outwardly extends perpendicularly from the axis of said ceramic shaft and said metal sleeve, and a tip portion of said metal sleeve axially spaced from said connection edge and radially spaced from said ceramic shaft, wherein said tip portion has a thickness within a range of about 0.5 mm to 1.5 mm and a portion of said metal sleeve which includes said connection edge has a thickness of greater than about 1.5 mm.

2. A shaft composite structure according to claim 1, wherein a portion of said metal sleeve between said connection edge and said tip portion is tapered, such that an inner diameter of said portion of said metal sleeve increases from said connection edge towards said tip portion.

3. A shaft composite structure according to claim 2, wherein said portion of said metal sleeve is tapered at an angle of under about 3.5° with respect to an axis of said metal rotary shaft.

4. A shaft composite structure according to claim 1, wherein a portion of said metal sleeve between said connection edge and said tip portion is circular shaped, such that an inner diameter of said portion of said metal sleeve increases from said connection edge towards said tip portion.

5. A shaft composite structure according to claim 4, wherein said portion of said metal sleeve has a radius of curvature equal to greater than about 3 mm.

6. A shaft composite structure comprising:
a ceramic turbine rotor having a ceramic shaft integrally formed thereon;
a metal rotary shaft having a metal sleeve integrally formed on a first end thereof, said metal sleeve having a first inner peripheral surface, a second inner peripheral surface, and a tip portion, said first inner peripheral surface being adjacent said first end of said metal rotary shaft, said tip portion being axially spaced from said first end, and said second inner peripheral surface being located between said first inner peripheral surface and said tip portion;
said metal sleeve being coaxially fixed to an outer surface of said ceramic shaft such that a longitudinal contact interface exists between a portion of said outer surface of said ceramic shaft and said first inner surface of said metal sleeve; and
a circumferential groove in an outer surface of said metal sleeve, said groove being located at a position in substantial alignment with a boundary between said first inner peripheral surface of said metal sleeve and said second inner peripheral surface thereof, such that said boundary and said groove are arranged substantially in a radial plane which outwardly extends perpendicularly from the axis of said ceramic shaft and said metal sleeve;
wherein said tip portion of said metal sleeve has a thickness of about 0.5 mm to about 1.5 mm and a portion of said metal sleeve proximate said first inner peripheral surface of said metal sleeve has a thickness greater than that of said tip portion.

7. A shaft composite structure according to claim 6, wherein said second inner peripheral surface is outwardly tapered from said first inner peripheral surface towards said tip portion.

8. A shaft composite structure according to claim 7, wherein said second inner peripheral surface is tapered at an angle of less than about 3.5° with respect to an axis of said metal rotary shaft.

9. A shaft composite structure according to claim 6, wherein said second innter peripheral surface is outwardly curved from said first inner peripheral surface towards said tip portion.

10. A shaft composite structure according to claim 9, wherein said outwardly curved second inner peripheral surface has a radius of curvature equal to greater than about 3.0 mm.

* * * * *